US009126616B2

(12) United States Patent
Crum

(10) Patent No.: US 9,126,616 B2
(45) Date of Patent: Sep. 8, 2015

(54) SHOPPING CART ATTACHMENT

(71) Applicant: Bryan E. Crum, Louisville, KY (US)

(72) Inventor: Bryan E. Crum, Louisville, KY (US)

(*) Notice: Subject to any disclaimer, the term of this patent is extended or adjusted under 35 U.S.C. 154(b) by 0 days.

(21) Appl. No.: 14/220,282

(22) Filed: Mar. 20, 2014

(65) Prior Publication Data

US 2015/0108190 A1    Apr. 23, 2015

Related U.S. Application Data

(60) Provisional application No. 61/892,655, filed on Oct. 18, 2013.

(51) Int. Cl.
  *B60R 7/00* (2006.01)
  *B62B 3/14* (2006.01)
  *B26B 5/00* (2006.01)

(52) U.S. Cl.
  CPC ............ *B62B 3/1428* (2013.01); *B26B 5/00* (2013.01); *B62B 3/1408* (2013.01); *B62B 3/1416* (2013.01)

(58) Field of Classification Search
  CPC .... B62B 3/1428; B62B 3/1408; B62B 3/1416
  USPC ......... 224/411, 409, 420, 453, 454, 277, 564, 224/558, 567, 571; 40/308, 661, 661.03, 40/661.08; 280/288.4, 304.5
  See application file for complete search history.

(56) References Cited

U.S. PATENT DOCUMENTS

| 2,864,189 | A |   | 12/1958 | Campbell |
| 2,888,761 | A |   | 6/1959 | Miller |
| 3,082,557 | A |   | 3/1963 | Huff |
| 3,251,543 | A |   | 5/1966 | Bush et al. |
| 3,290,809 | A | * | 12/1966 | King .......................... 40/642.01 |
| 3,964,134 | A |   | 6/1976 | Newtson |
| 3,982,659 | A |   | 9/1976 | Ross |
| 4,292,749 | A |   | 10/1981 | Thomas |
| 4,496,058 | A |   | 1/1985 | Harris et al. |
| 4,535,912 | A |   | 8/1985 | Bonk |
| 4,583,753 | A |   | 4/1986 | Economy |
| 4,685,701 | A |   | 8/1987 | Amundson et al. |
| 4,848,117 | A |   | 7/1989 | Welborn et al. |
| 4,848,584 | A | * | 7/1989 | Windorski ................... 206/565 |
| 4,899,886 | A |   | 2/1990 | Johansen |
| 4,901,901 | A |   | 2/1990 | Reitenour |
| 4,919,377 | A | * | 4/1990 | Alexander et al. ....... 248/223.41 |

(Continued)

FOREIGN PATENT DOCUMENTS

| AT | 001523 U2 | 6/1997 |
| BR | 6602284 U | 6/1988 |

(Continued)

OTHER PUBLICATIONS

Zmuda, Natalie; Check-in Apps' Next Stop: Your Supermarket Aisles; Article; Nov. 15, 2010; AdAge.com; US.

*Primary Examiner* — Brian D Nash
*Assistant Examiner* — Corey Skurdal
(74) *Attorney, Agent, or Firm* — Middleton Reutlinger

(57) ABSTRACT

A shopping cart attachment is mounted to the handlebar of a shopping cart to facilitate fast and easy installation and removal of a multi-page booklet, such as may be used to provide advertisements and/or informational material to a customer. In addition, the attachment may include a raised ledge that may be used to retain a customer's mobile phone, tablet, shopping list, coupons and/or writing utensil while shopping.

23 Claims, 16 Drawing Sheets

(56) References Cited

U.S. PATENT DOCUMENTS

| | | | |
|---|---|---|---|
| 4,978,006 A | 12/1990 | Juteau | |
| 4,988,025 A | 1/1991 | Lipton et al. | |
| 4,993,583 A | 2/1991 | Chasen | |
| 5,002,215 A | 3/1991 | Gregoire | |
| 5,004,252 A | 4/1991 | Kraper | |
| 5,038,986 A | 8/1991 | Beauchesne | |
| 5,048,736 A | 9/1991 | Anatra | |
| 5,086,960 A | 2/1992 | Schwietzer | |
| 5,114,009 A | 5/1992 | Johnston | |
| 5,263,578 A | 11/1993 | Narvey | |
| 5,305,935 A | 4/1994 | Weiner | |
| 5,407,512 A * | 4/1995 | Policht | 156/247 |
| 5,424,524 A | 6/1995 | Ruppert et al. | |
| 5,429,377 A | 7/1995 | Duer | |
| 5,489,120 A | 2/1996 | Thornsburg | |
| 5,566,609 A | 10/1996 | Kirschner | |
| 5,597,104 A | 1/1997 | Elliott | |
| 5,607,067 A * | 3/1997 | Morrissey | 211/50 |
| 5,617,982 A | 4/1997 | Wilson | |
| 5,836,051 A | 11/1998 | Myers | |
| 5,848,723 A | 12/1998 | Krautsack | |
| D405,820 S | 2/1999 | Larson | |
| 5,981,211 A | 11/1999 | Hu et al. | |
| 6,000,610 A | 12/1999 | Talbott et al. | |
| 6,070,744 A * | 6/2000 | Levinson et al. | 211/50 |
| 6,158,640 A | 12/2000 | Karp et al. | |
| 6,177,880 B1 | 1/2001 | Begum | |
| 6,284,177 B1 | 9/2001 | Ewing | |
| 6,299,119 B1 | 10/2001 | Dunning | |
| 6,408,553 B1 | 6/2002 | Brown et al. | |
| 6,453,588 B1 | 9/2002 | Lykens | |
| 6,584,712 B2 | 7/2003 | Magid | |
| 6,644,501 B2 | 11/2003 | Iida | |
| 6,898,884 B1 | 5/2005 | Meyenberg | |
| 7,222,101 B2 | 5/2007 | Bishop et al. | |
| 7,584,149 B1 | 9/2009 | Bishop et al. | |
| 7,681,344 B2 | 3/2010 | Crum | |
| 7,873,543 B2 | 1/2011 | Perrier et al. | |
| 7,895,777 B2 | 3/2011 | Crum | |
| 8,336,774 B2 | 12/2012 | Crum | |
| 2002/0070141 A1 | 6/2002 | Iida | |
| 2004/0069918 A1 | 4/2004 | McKinney | |
| 2005/0126060 A1 * | 6/2005 | Rawlings et al. | 40/661.03 |
| 2006/0011728 A1 | 1/2006 | Frantz et al. | |
| 2006/0266904 A1 | 11/2006 | Crum | |
| 2008/0010873 A1 | 1/2008 | Crum | |
| 2008/0052159 A1 | 2/2008 | Balakrishnan et al. | |
| 2009/0192892 A1 | 7/2009 | Cason | |
| 2009/0234731 A1 | 9/2009 | Mariotti | |
| 2010/0072715 A1 | 3/2010 | Crum | |
| 2010/0078475 A1 | 4/2010 | Lin et al. | |
| 2010/0272193 A1 | 10/2010 | Khan et al. | |
| 2010/0274647 A1 | 10/2010 | Earle | |
| 2011/0047023 A1 | 2/2011 | Lieblang et al. | |
| 2011/0062237 A1 | 3/2011 | Chaves | |
| 2011/0071895 A1 | 3/2011 | Masri | |
| 2011/0131846 A1 | 6/2011 | Crum | |
| 2011/0215138 A1 | 9/2011 | Crum | |
| 2011/0221149 A1 | 9/2011 | Crum | |
| 2013/0041752 A1 | 2/2013 | Crum | |
| 2013/0091003 A1 | 4/2013 | Crum | |
| 2013/0185150 A1 | 7/2013 | Crum | |

FOREIGN PATENT DOCUMENTS

| | | |
|---|---|---|
| BR | PI96079711 A | 5/2001 |
| BR | MU 82019452 | 5/2004 |
| BR | PI03036839 A | 5/2005 |
| BR | DI66006899 F | 7/2006 |
| BR | MU85030880 U | 7/2007 |
| CA | 2459153 A1 | 10/2004 |
| DE | 19955074 A1 | 5/2001 |
| EP | 0895920 A1 | 2/1999 |
| FR | 2713004 A1 | 6/1995 |
| GB | 2176332 A | 12/1986 |
| GB | 2386354 A | 9/2003 |
| WO | 92/05060 A1 | 4/1992 |
| WO | 96/11130 A1 | 4/1996 |
| WO | 9721207 A1 | 6/1997 |
| WO | 2006117627 A1 | 11/2006 |

* cited by examiner

SHOPPING CART ATTACHMENT

CROSS-REFERENCE TO RELATED APPLICATION

This application claims the benefit of U.S. Provisional Application No. 61/892,655 filed on Oct. 18, 2013 by Bryan E. Crum, the entire disclosure of which is incorporated by reference herein in its entirety.

BACKGROUND

Shopping carts are routinely used by customers of a retail establishment to store items prior to purchase as the customers shop and/or to transport purchased items to customers' vehicles. Various types of devices have been developed over the years for attaching to the handlebars of shopping carts. For example, devices have been developed to provide customers with various shopping tools such as writing surfaces, calculators, notepads, and writing utensils. In addition, some devices have been developed that include clips for holding notes, coupons or shopping lists.

Such devices are also often used for marketing and/or informational purposes, and may include store logos, store directories, advertisements and/or coupons. One particular design, for example, includes a backplate that is surrounded and partially overlapped on all four sides by a lip, with a laminated sheet adhered to the backplate to provide a store directory and/or advertisements for display to a customer. In addition, the design may utilize a removable multi-page booklet that includes multiple laminated pages bound together along a binding that may be inserted under the lip around and over the top of the backplate. The booklet is typically adhered to the laminated sheet mounted to the backplate using an adhesive strip disposed on a back page of the booklet, and the back page is typically clear to enable the laminated sheet mounted to the backplate to remain visible.

It has been found, however, that limitations exist in conventional designs. For example, the use of adhesives to secure booklets to such designs can lead to adhesive build-up over time, or to delamination of the underlying laminated sheet, particularly when booklets are replaced on a regular basis to update the advertisements presented to customers. In addition, removing and replacing booklets can be a time-consuming operation considering that a typical retail establishment such as a grocery store may have hundreds of shopping carts in use at any given time. Installation may also be complicated by weather concerns when using adhesives, as shopping carts may need to be wiped off or allowed to dry prior to replacing booklets.

SUMMARY

The embodiments disclosed herein provide a device that may be mounted to the handlebar of a shopping cart, and that facilitates a fast and easy installation and removal of a multi-page booklet, such as may be used to provide advertisements and/or informational material to a customer. In addition, the device may include a raised ledge that may be used to retain a customer's mobile phone, tablet, shopping list, coupons and/or writing utensil while shopping.

In one embodiment, a contiguous slot may be provided along an edge of the device and through which a binding portion of a multi-page booklet may be inserted. In some embodiments, a security tab, which may be implemented in some embodiments as a back page of the multi-page booklet, may extend from the binding only a portion of the way from the other pages in the multi-page booklet, and may deflect away from the other pages of the booklet and extend along an underside of the device when the booklet is withdrawn back from the slot, thereby temporarily retaining the multi-page booklet in the device. By doing so, an informational display mounted to a support surface of the device is not obstructed or occluded by any page of the booklet when the pages overlaying the support surface are lifted. In addition, in some embodiments, no adhesive is required to retain the booklet in the device.

In other embodiments, various alternate configurations may be used to secure a multi-page booklet to a device, including, for example, a clamp or various fastener configurations. In still other embodiments, no multi-page booklet may be used, with only a single sided informational display presented to a customer.

Therefore, consistent with one aspect of the invention, a shopping cart attachment includes a body including a support surface, and a frame extending around at least a portion of the support surface and separated from the support surface substantially along a first edge of the support surface by a slot. The slot is configured to receive a multi-page booklet to thereby retain the multi-page booklet with the multi-page booklet overlaying at least a portion of the support surface.

Consistent with another aspect of the invention, a shopping cart includes a handlebar and a shopping cart attachment mounted to the handlebar, wherein the shopping cart attachment includes a body including a support surface, and a frame extending around at least a portion of the support surface and separated from the support surface substantially along a first edge of the support surface by a slot. The slot is configured to receive a multi-page booklet to thereby retain the multi-page booklet with the multi-page booklet overlaying at least a portion of the support surface.

Consistent with yet another aspect of the invention, a combination shopping cart attachment and multi-page booklet includes a body including a support surface and configured to mount to a shopping cart handlebar, a frame extending around the support surface and separated from the support surface substantially along a first edge of the support surface by a contiguous slot, and a multi-page booklet received in the slot and overlaying at least a portion of the support surface. The multi-page booklet includes a plurality of pages and a security tab bound together along a binding, where the binding is received in the slot and the security tab is deflected away from the plurality of pages and extends along an underside of the body.

Consistent with still another aspect of the invention, a method is provided for securing a multi-page booklet onto a shopping cart attachment mounted to a shopping cart handlebar, where the multi-page booklet includes a security tab and at least one page bound together along a binding. The method includes inserting the binding of the multi-page booklet into a contiguous slot defined on a body of the shopping cart attachment, where the slot extends along a first edge of a support surface of the body and separates the support surface from a frame that extends around at least a portion of the support surface, and after the multi-page booklet is inserted into the slot such that a distal edge of the security tab has passed the first edge of the support surface, withdrawing the multi-page booklet from the slot with the security tab extending on an underside of the body and deflected away from the at least one page of the multi-page booklet, and with the at least one page of the multi-page booklet overlaying at least a portion of the support surface.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
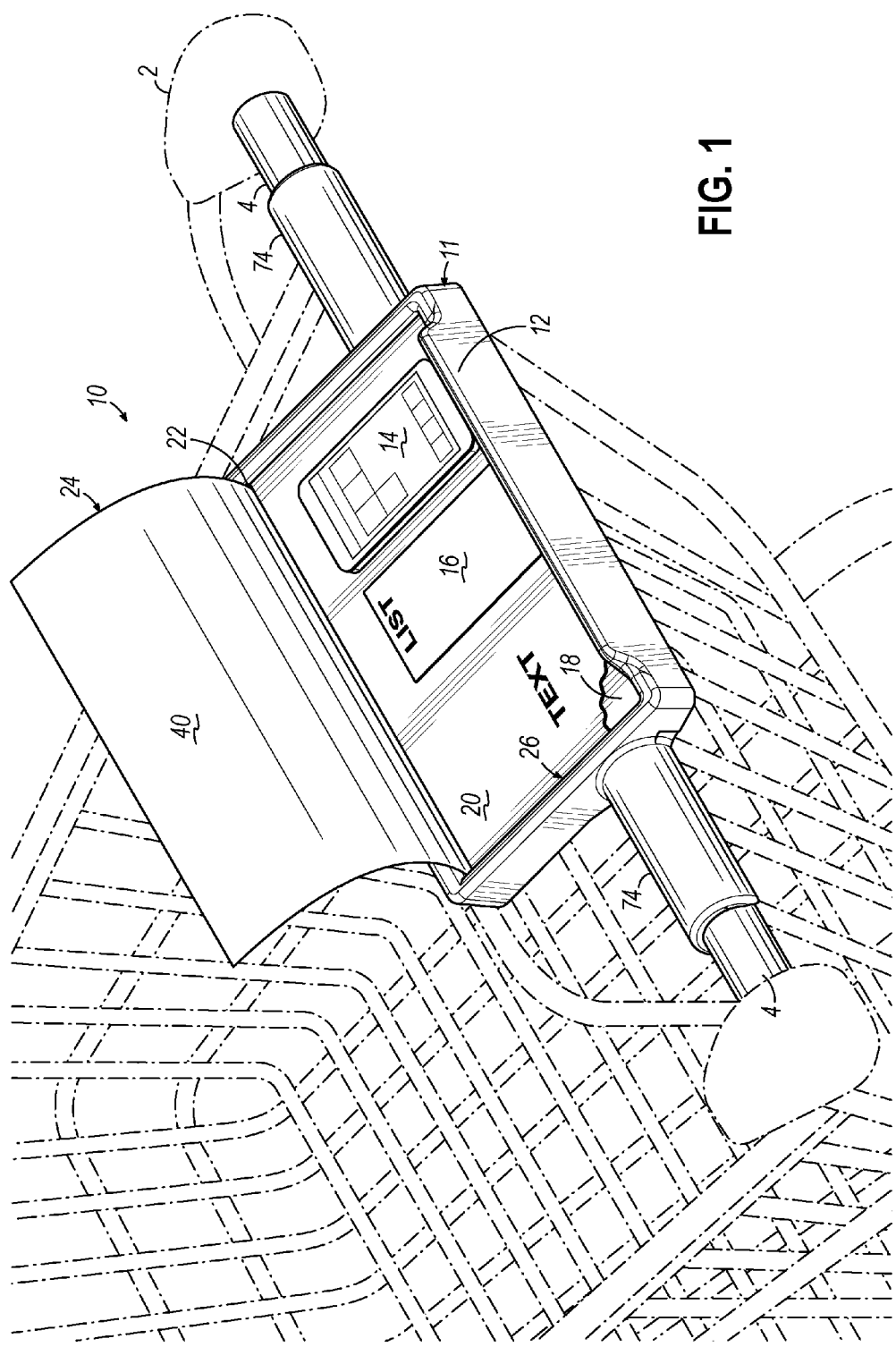
FIG. 1 is a perspective view of a portion of a shopping cart having mounted thereto a shopping cart attachment consistent with the invention.

Turning now to the drawings, wherein like numbers denote like parts throughout the several views, FIG. 1 illustrates an example of a device 10 mounted to a handlebar 4 of a shopping cart 2. Device 10 provides a ledge 12 for holding various items, including, for example, mobile phones 14, tablets, shopping lists 16, coupons and other items customers may use while in a retail establishment. Device 10 includes a body 11 with a support surface 18 for retaining a single sided informational display 20, as well as a frame 26 and a slot 22 for retaining a multi-page booklet 24, desirably such that single sided informational display 20 on support surface 18 is unobstructed and fully viewable when the pages of booklet 24 are lifted off the support surface in the general manner illustrated in FIG. 1. Device 10 is illustrated in FIG. 1 holding a mobile phone 14 and a shopping list 16 and has both a single sided informational display 20 and a multi-page booklet 24 mounted thereto for displaying sales and other information. Each of informational display 20 and multi-page booklet 24 may include information that is helpful to a shopper, such as a store directory, contact information, a web site address, a bar or QR code to access electronic information, etc., as well as advertising and/or marketing materials, such as advertisements, coupons, etc.

Figure 2:
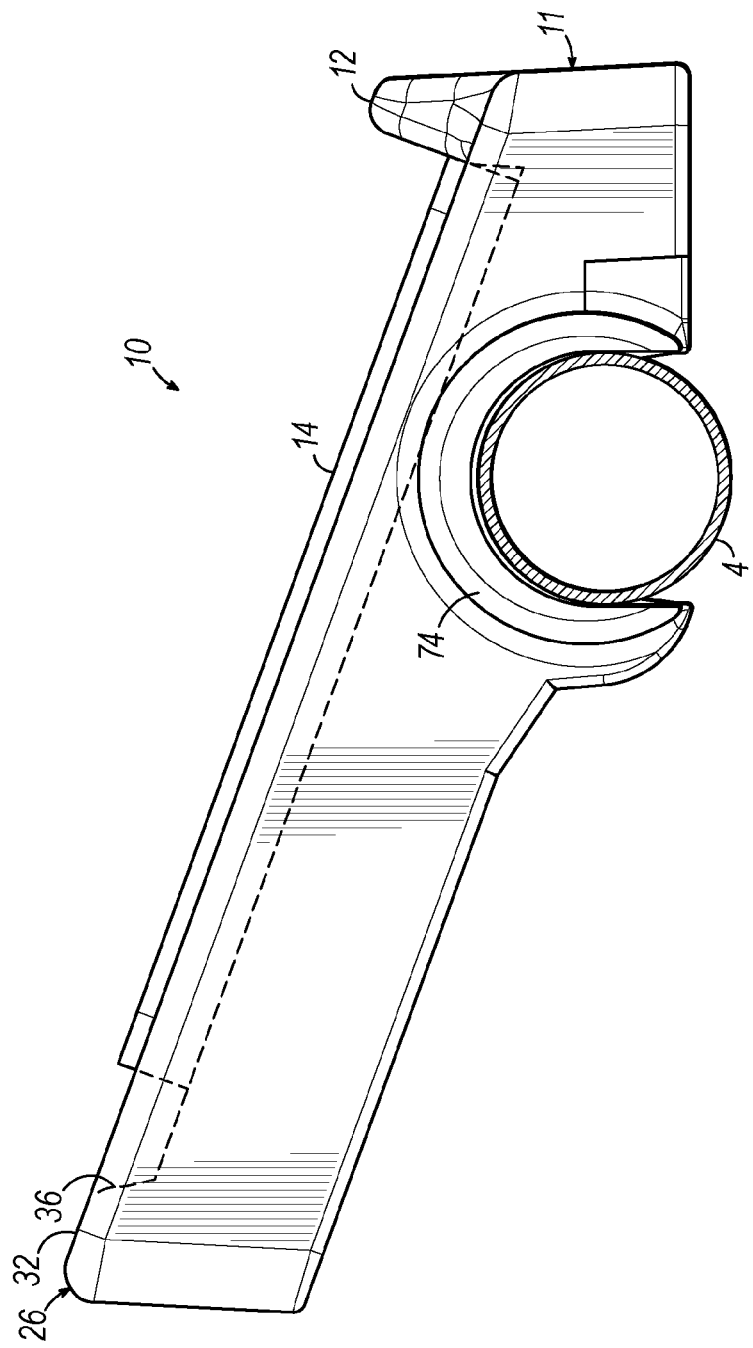
FIG. 2 is a left side elevational view of the shopping cart attachment of FIG. 1.

As shown in FIG. 2, ledge 12, which is defined in frame 26, may be used to retain or hold items shoppers use while in-store such as mobile phones 14, shopping lists, coupons, writing utensils and more. Ledge 12 assists with keeping these items from sliding off of device 10 when the device is installed with support surface 18 at an inclined angle for easier viewing by shoppers of the printed materials secured to the device. Ledge 12 may be integrally molded on device 10, or may be a separate component that is installed on device 10 using fasteners, adhesives, locking tabs, or in other manners known in the art. Ledge 12 may also be omitted in some embodiments.

Figure 3A:
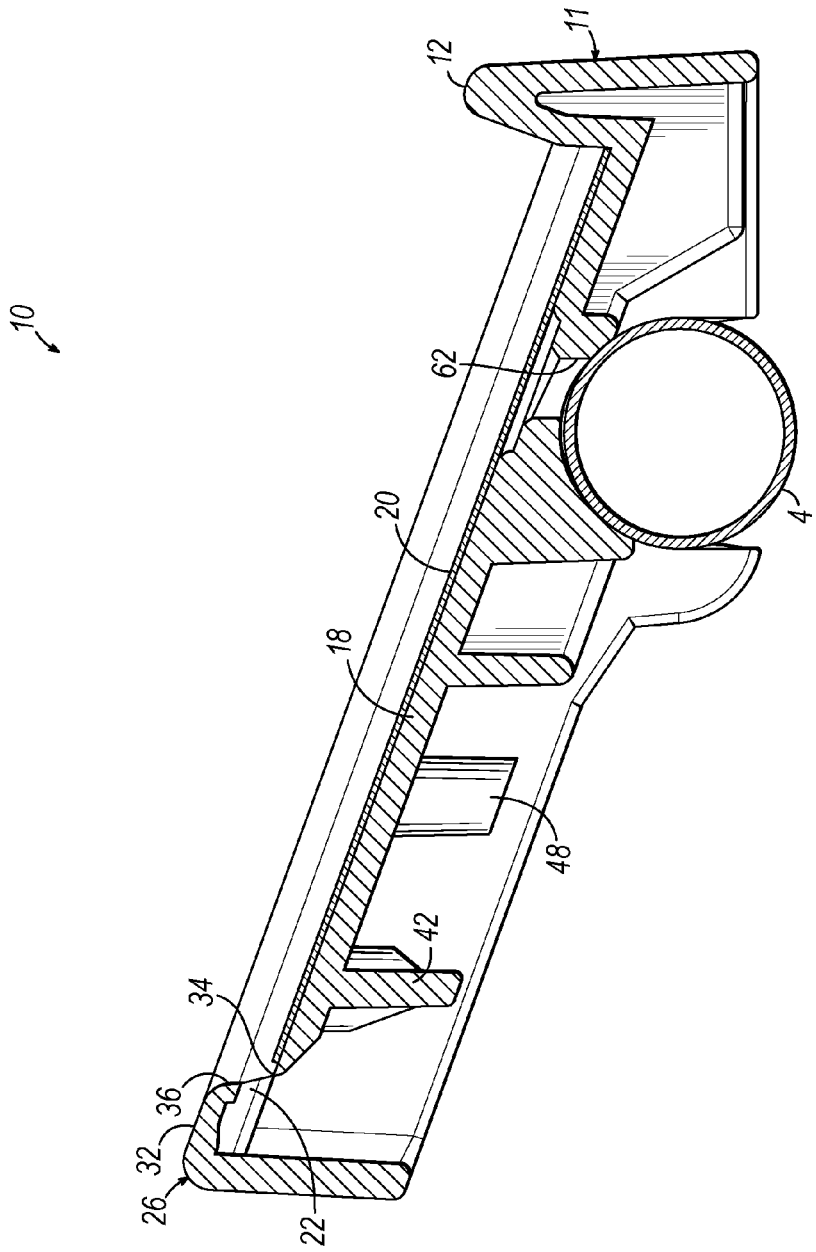
FIG. 3A is a cross-sectional view of the shopping cart attachment of FIG. 1.
Figure 3B:
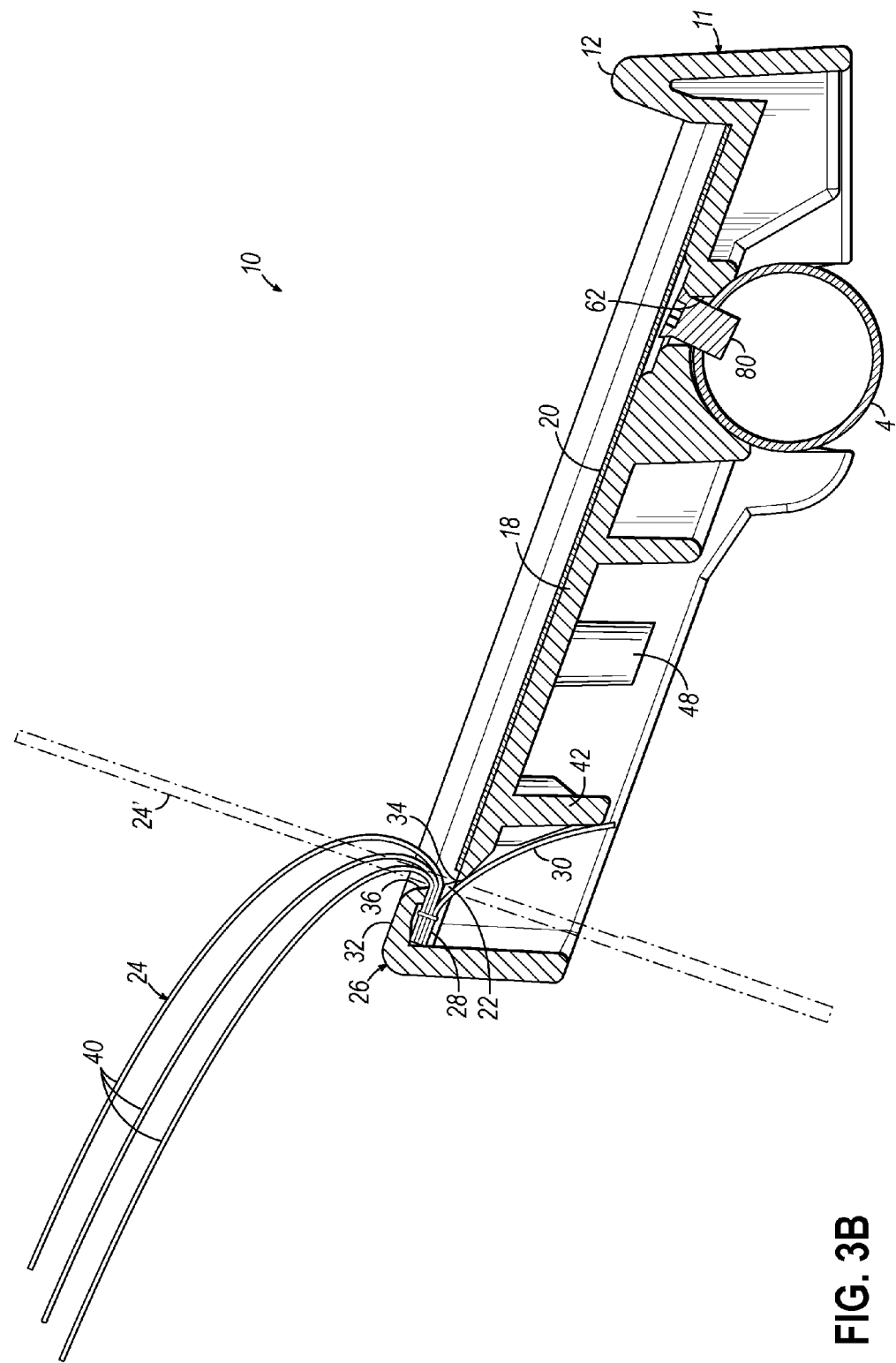
FIG. 3B is a cross-sectional view of the shopping cart attachment of FIG. 1, illustrating the installation of a multi-page booklet therein.

As best shown in FIGS. 3A and 3B, device 10 may include an insertion slot 22 separating frame 26 from support surface 18 proximate a top side of the device, though it will be appreciated that the insertion slot may be disposed on other sides of the device in other embodiments. In this regard, directions relative to device 10, such as "top", "bottom", "underside", "left" and "right" are considered from the perspective of a customer when the device is installed on a shopping cart and the customer is using the shopping cart in a customary manner.

Thus, a top portion 32 of frame 26 extends along slot 22 and is separated from support surface 18. Top portion 32 may optionally include a downwardly turned edge 36, although it will be appreciated that edge 36 does not form a lip or otherwise overhang any portion of support surface 18, as a top edge 34 of support surface 18 is both horizontally and vertically separated from edge 36. Put another way, if support surface 18 is considered to define a plane, edge 34 and edge 36 are separated from one another both in a direction transverse from the plane (i.e., generally vertically in FIG. 3A) as well as in a direction along the plane (which is also generally transverse to the slot, i.e., generally horizontally in FIG. 3A). Left, right and bottom portions of frame 26, in contrast, turn downwardly to extend generally transverse to support surface 18 to provide both ledge 12 and to otherwise frame a multi-page booklet 24 when installed in device 10. The frame 26 and support surface 18 may be integrally molded together on the left, right and bottom sides of device 10, although the invention is not so limited. In some embodiments, however, the amount of horizontal and/or vertical separation may vary when defining a slot, and in some embodiments, no horizontal separation may be provided, such that edge 36 is generally aligned with edge 34 but separated vertically therefrom. In still other embodiments, frame 26 may not extend completely around support surface 18, and may only extend around a portion thereof. For example, in some embodiments frame 26 may be omitted from one or more of the left, right and bottom edges of support surface 18, or even portions of such edges. In one example embodiment, for example, a discontinuity may be provided on one or both of the left and right portions of frame 26 to facilitate lifting pages 40 of multi-page booklet 24.

Figure 5:
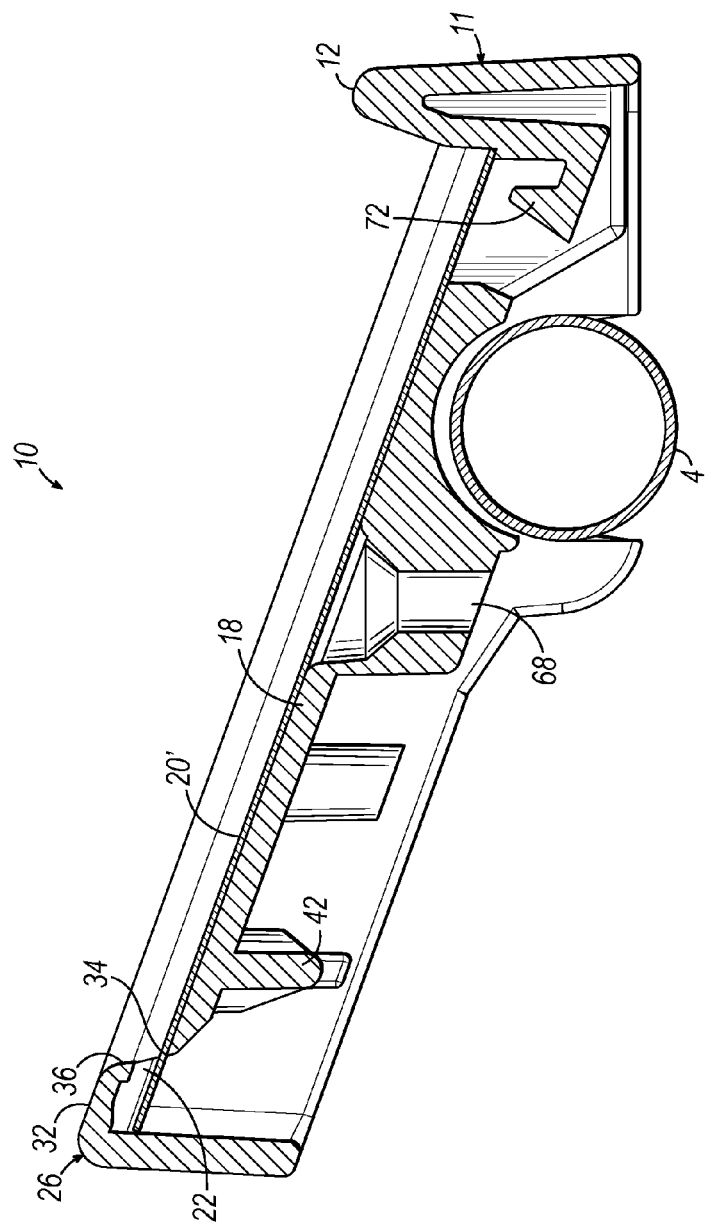
FIG. 5 is a cross-sectional view of the shopping cart attachment of FIG. 1, illustrating an alternate single sided informational sheet mounted thereto.

FIG. 3A also illustrates both a single sided informational display 20 and a multi-page booklet 24 retained by device 10. Display 20 may be a laminated sheet including informational and/or marketing information, and may be adhered to support surface 18 in a permanent or semi-permanent manner, e.g., using an adhesive. As illustrated in FIG. 3A, display 20 may be sized in a vertical direction similar to support surface 18, such that the display does not project into slot 22. Alternatively, as illustrated in FIG. 5, a display 20' may be sized in a vertical direction to extend beyond top edge 34 of support surface 18, through slot 22 and under top portion 32 of frame 26. In this manner, when there is no desire to utilize multi-page booklets with device 10, display 20' may be used to at least partially cover slot 22 to provide an improved cosmetic appearance.

Returning to FIG. 3B, multi-page booklet 24 may be inserted into slot 22 and secured in device 10 independent of the single sided informational display 20 by inserting booklet 24 along a binding 28 through slot 22 and past the length of a back page, or security tab, 30, and then pulled back again until security tab 30 is separated from the other pages 40 of booklet 24 by support surface 18 and binding 28 is retained under device frame 26. By virtue of the lateral separation of frame edge 36 from top edge 34 of support surface 18, booklet 24 may be oriented generally transverse (though not necessary orthogonal or at a 90 degree angle) to support surface 18 when first inserting the booklet into slot 22 to enable the booklet, as well as binding 28 thereof, to be inserted a sufficient distance to enable security tab 30 to be inserted completely through slot 22 and thereafter separated from pages 40, as illustrated in phantom at 24'. Security tab 30 may be formed from a plastic sheet and pages 40 may be laminated sheets containing informational and/or marketing information, and may be bound together with binding 28, e.g., using one or more staples. With tab 30 separated from pages 40 and extending on the underside of body 11 and/or support surface 18, binding 28 cannot be removed from slot 22, thereby retaining booklet 24 in device 10. In addition, due to the resilient nature of both tab 30 and pages 40, when tab 30 is separated from pages 40 and deflected on the underside of body 11 and/or support surface 18 (which may be further enhanced in some embodiments through the use of a rib 42), a clamping force is applied on opposite sides of support surface 18 to assist in retaining booklet 24 in device 10.

In some embodiments, once booklet 24 is inserted a sufficient distance into slot 22 such that a distal edge (e.g., an edge distal from binding 28) of security tab 30 has passed top edge 34 of support surface 18, the booklet may thereafter be withdrawn (e.g., pushed or pulled) a distance back out of the slot until security tab 30 separates from other pages 40. In some instances, top edge 34 of support surface 18 may be beveled, e.g., as illustrated in FIG. 3B, to facilitate separation of the security tab from the other pages of the booklet.

Removal of booklet 24 from device 10 may be performed in some embodiments by lifting pages 40 of booklet 24 to orient the booklet in a generally transverse orientation (illustrated in phantom at 24') to support surface 18, and pushing the booklet further into slot 22 until security tab 30 is allowed to lay substantially flat along pages 40. Thereafter, the booklet 24 (including security tab 30) may be pulled fully out of slot 22. It may be desirable in some embodiments to provide an open back on device 10 (e.g., such that the underside of body 11 and/or support surface 18 is exposed) so that removal of booklet 24 may be performed by continuing to push booklet 24 further into slot 22 (or pulling booklet 24 further through the slot from the underside of body 11 and/or support surface 18) until booklet 24 has completely passed through the slot.

It will be appreciated that slot 22 extends contiguously for at least the width of security tab 30, which may or may not be the same as the width of the other pages 40 in booklet 24. In some embodiments, slot 22 may be contiguous for at least the width of booklet 24, thereby enabling the booklet to be inserted into slot 22 a sufficient distance to enable security tab 30 to separate from pages 40 and extend along the underside of body 11 and/or support surface 18.

In addition, in some embodiments, multiple security tabs 30 may be used, with a separate slot defined for each tab. In such embodiments, it may be desirable to include channels or slots in both the security tab 30 and pages 40 that extend generally orthogonal to binding 28 and are configured to receive any structural components disposed between adjacent slots in device 10, e.g., any structural components that separate adjacent slots and connect support surface 18 to frame 26.

It will also be appreciated that the length of security tab 30 may vary in different embodiments. A shorter length, for example, may enable the tab 30 to be fully retained within the interior volume defined on the underside of the device.

Figure 3C:
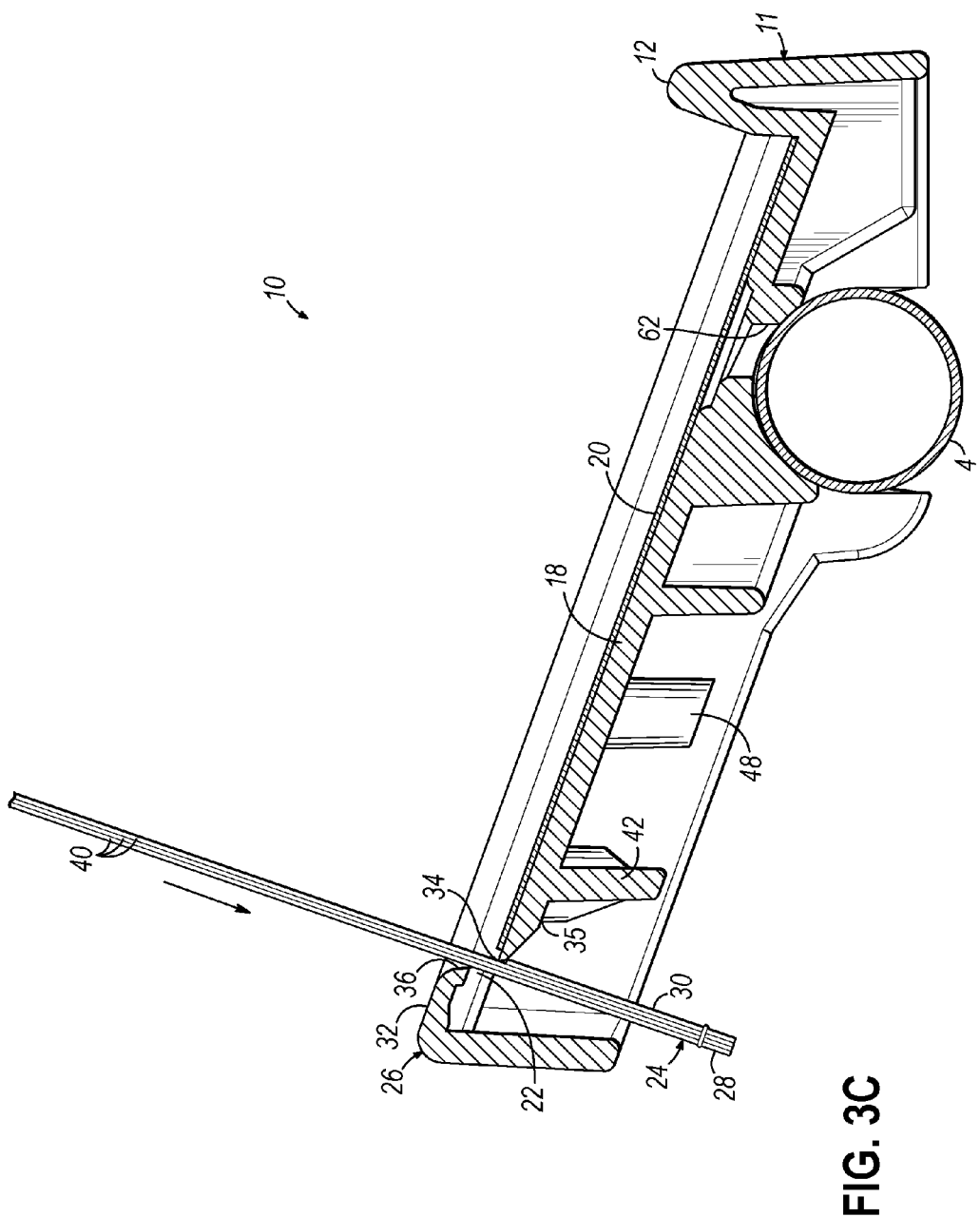
FIGS. 3C-3E are cross-sectional views of the shopping cart attachment of FIG. 1, illustrating a method of installing a multi-page booklet therein.
Figure 3D:
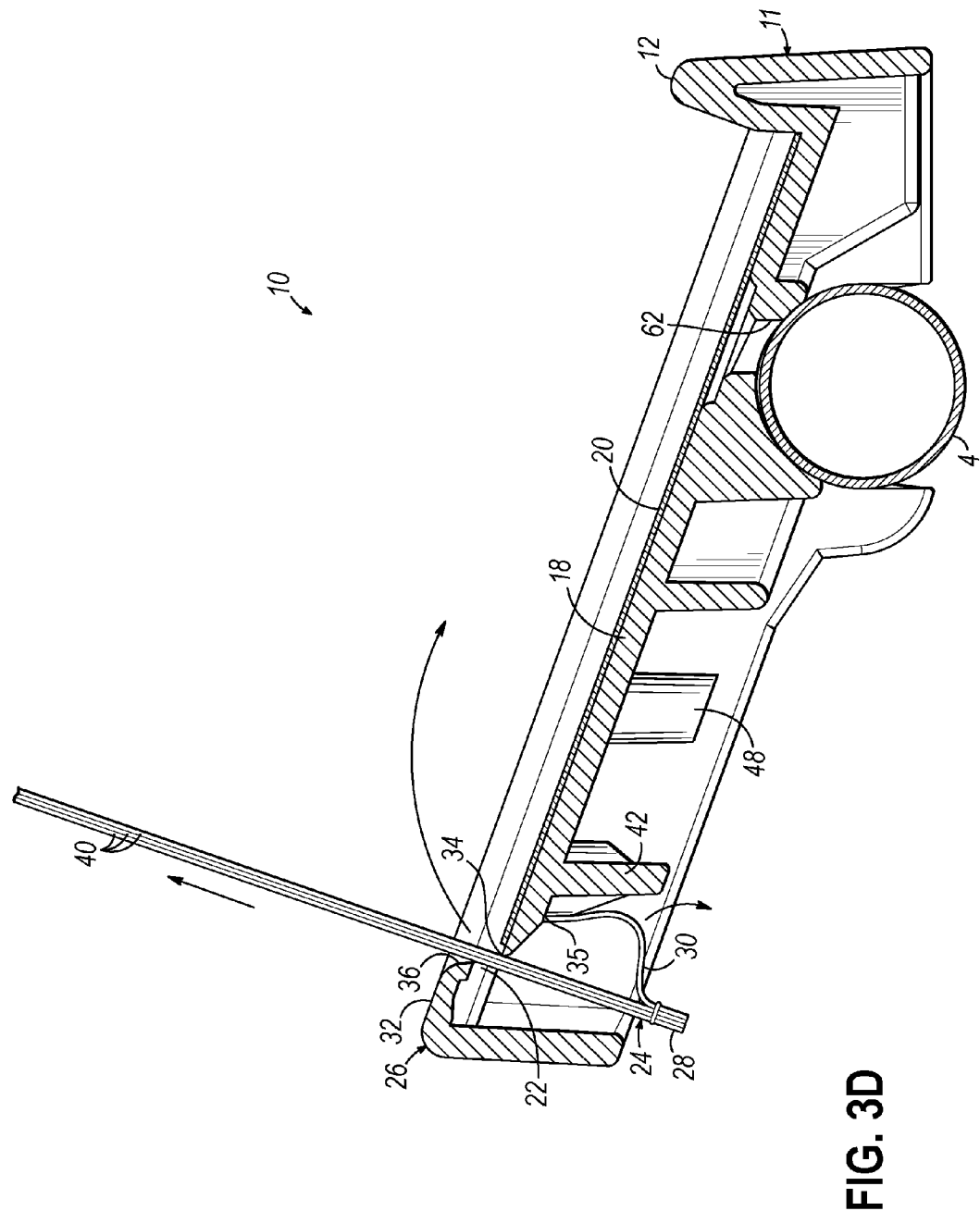
Figure 3E:
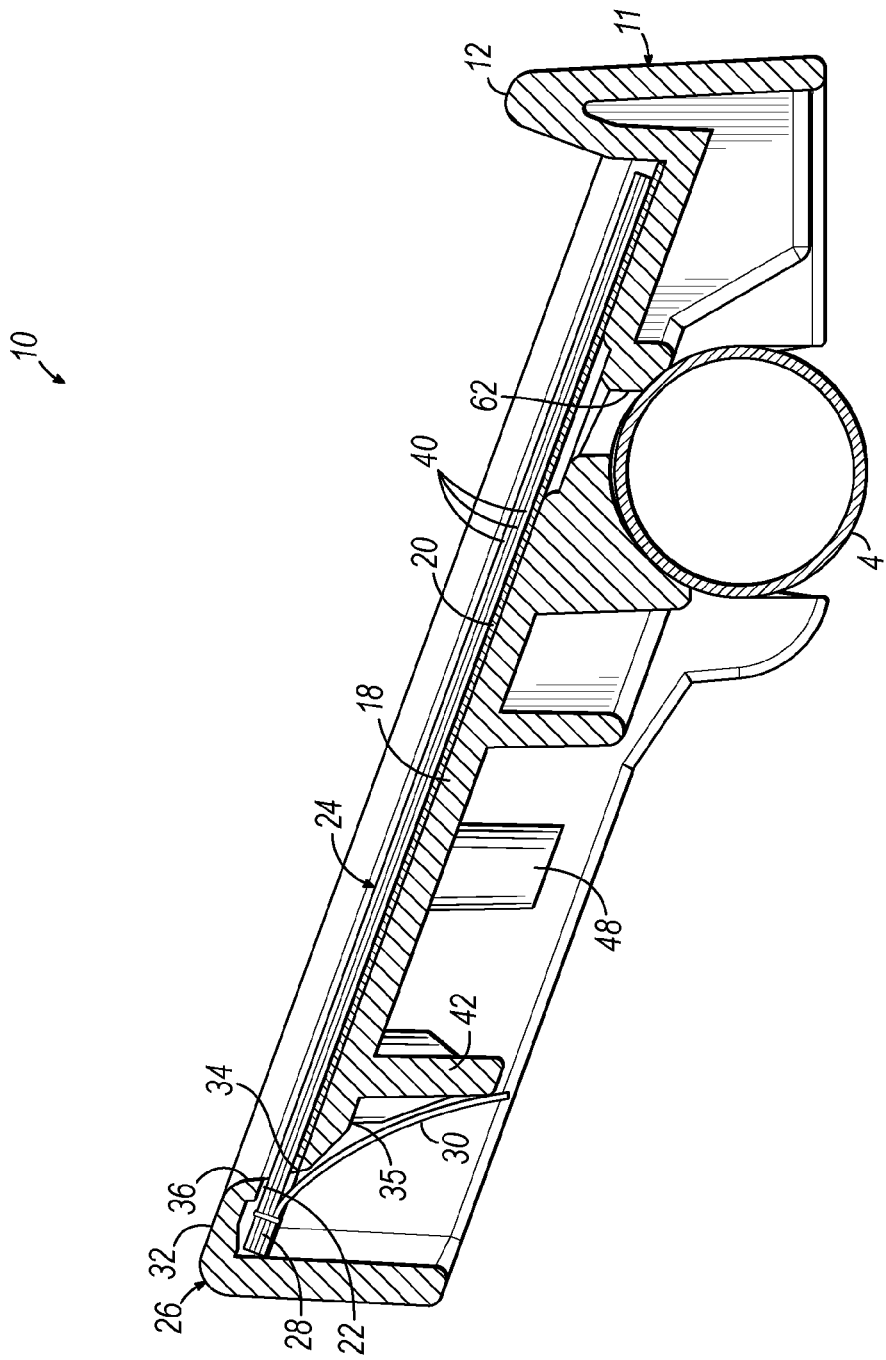

FIGS. 3C-3E further illustrate a method of installing a booklet 24 in device 10. As shown in FIG. 3C, booklet 24 may be inserted through slot 22 from a top side of support surface 18 until a distal edge of security tab 30 is inserted beyond top edge 34 of support surface 18. Then, as shown in FIG. 3D, booklet 24 may be withdrawn (e.g., pushed or pulled in an opposite direction) until security tab 30 engages top edge 34 and begins to separate and deflect away from pages 40. Then, as shown in FIG. 3E, continued movement of booklet 24 further deflects and separates security tab 30 from pages 40, and pivoting of pages 40 of booklet 24 toward support surface 18 enables binding 28 to be received on an underside of top portion 32 of frame 26, and with pages 40 resting on support surface 18. The resiliency of pages 40 and security tab 30 effectively "pinch" or apply a clamping force across the opposing sides of support surface 18. Further, in some embodiments, pages 40 may be sized relative to device 10 to permit some sliding of booklet 24 in a direction generally between the top and bottom portions of frame 26. It should also be noted that at least a portion of binding 28 is effectively hidden under the top portion 32 of frame 26.

Figure 4A:
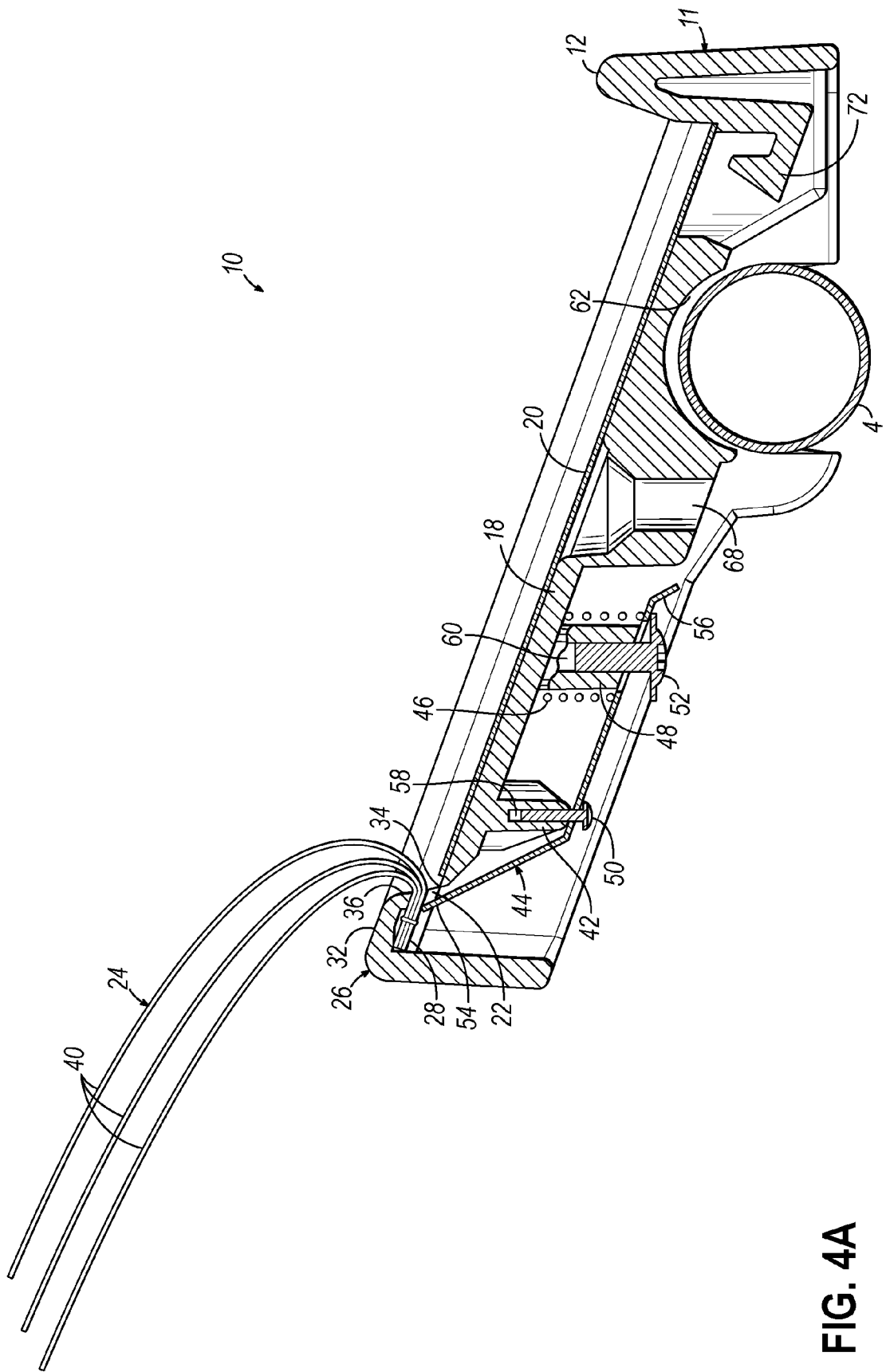
FIG. 4A is a cross-sectional view of the shopping cart attachment of FIG. 1, illustrating an alternate configuration utilizing a clamp to retain a multi-page booklet.

It will be appreciated that various alternative mounting configurations may be used to retain a booklet 24 in device 10 in other embodiments. As illustrated in FIG. 4A, for example, it may be desirable to utilize a spring loaded clamp 44 that pivots about rib 42 and is biased to the position illustrated in FIG. 4A by one or more springs 46 disposed on one or more posts 48 formed on the underside of body 11 and/or support surface 18 Fasteners 50, 52 (e.g., screws) may be respectively received in openings 58, 60 in rib 42 and posts 48 (see FIG. 8) and project through apertures in clamp 44 to secure clamp 44 to device 10. The apertures in clamp 44 corresponding to fasteners 52 are sized to allow posts 48 to project through the apertures, while the apertures in clamp 44 corresponding to fasteners 50 are sized to permit clamp 44 to sufficiently pivot about rib 42 (the heads of fasteners 50 may also be somewhat separated from rib 42 to facilitate pivoting). A clamping edge 54 is pressed against binding 28 to retain booklet 24 in device 10, and insertion and removal of booklet 24 is performed by depressing clamp 44 proximate an opposite edge 56 from clamping edge 54. In addition, it may be desirable to orient clamping edge 54 relative to booklet 24 such that the clamping edge 54 engages staples in binding 28 to further restrict booklet 24 from being pulled out of slot 22 while engaged by clamp 44.

As another alternative, apertures, catches or other retainers by be provided on opposing sides of the frame to retain the ends of the binding, or other structure mounted to a binding such as a rod or pin extending along the binding. In another embodiment, holes may be formed in the binding such that pins, posts, fasteners or other structures (collectively referred to herein as pins for convenience) may project through the binding to retain the binding in the device. The pins may be formed on the device or may be secured thereto, and in various embodiments may be installed and/or removed from the topside or underside of the device. The pins may generally be configured to project through cooperative holes in the multi-page booklet when the multi-page booklet is received in a slot to restrict removal of the multi-page booklet from the slot.

Figure 4B:
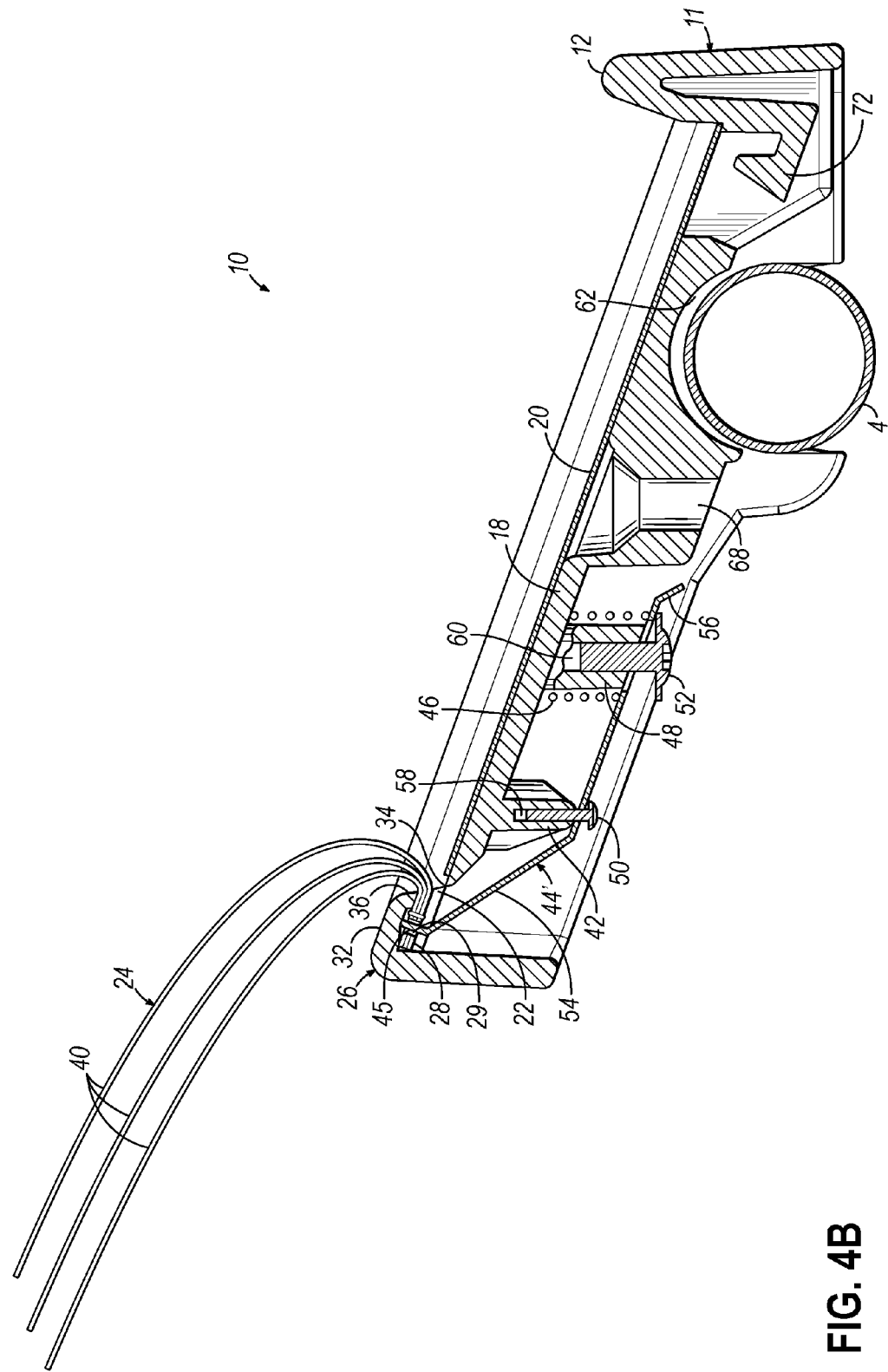
FIG. 4B is a cross-sectional view of the shopping cart attachment of FIG. 1 and similar to FIG. 4A, illustrating an alternate configuration utilizing a clamp with pins to retain a multi-page booklet.

For example, as shown in FIG. 4B, an alternative clamp 44' may include a plurality of pins 45 that project through corresponding holes 29. The pins 45 may be integrally formed on clamp 44' (e.g., configured as tabs), or may be attached in other manners. As such, the clamp may be movable to selectively withdraw the pins from cooperative holes in a multi-page booklet to permit removal of the multi-page booklet from the slot.

Figure 4C:
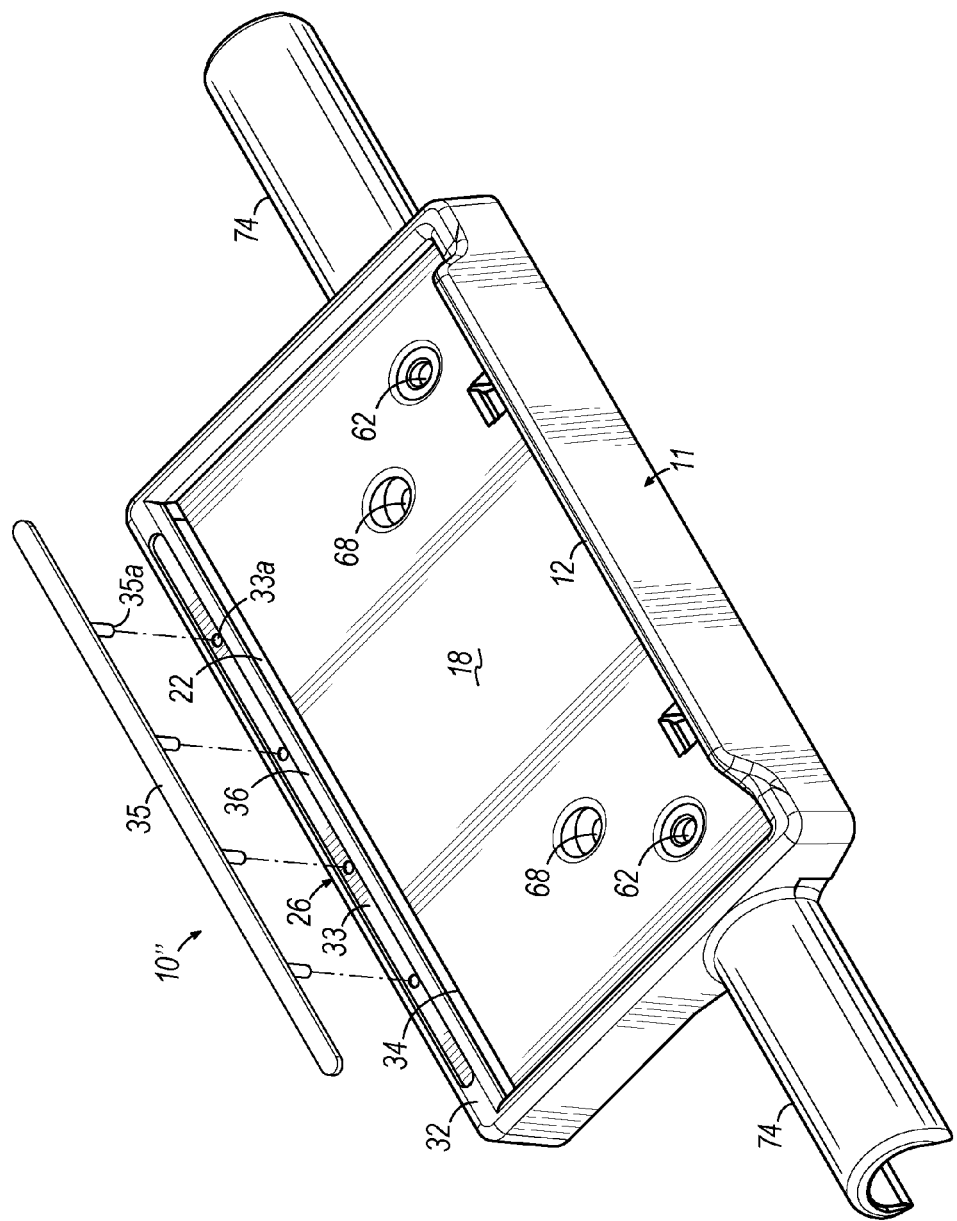
FIG. 4C is a perspective view of a shopping cart attachment including an alternate configuration for securing a multi-page booklet using a frame insert.

As another example, pins may be formed on a cover that overlays and hides the binding and that is secured to the device via tabs, fasteners, or other structure. In some embodiments, the cover may be secured from the underside of the device to provide a finished appearance to the device. Alternatively, as shown by device 10" of FIG. 4C, frame 26 may include a recess 33 with a plurality of apertures 33a and into which may be received a cover 35 including a plurality of pins 35a that may be received in apertures 33a to project through corresponding holes in the binding of a multi-page booklet when cover 35 is fit into recess 33. In some embodiments, cover 35 may be formed of a similar material to frame 36, and detents, tabs or a pressure-fit arrangement may be used to secure cover 35 to frame 26 in an aesthetically pleasing manner, and such that cover 35 may be removed relatively easily when it is desirable to remove a booklet, e.g., by prying cover 35 out of recess 33. In other embodiments, cover 35 may be secured via fasteners, or pins 35a may be secured on the underside of device 10" to prevent cover 35 from being pulled out of recess 33. In still other embodiments, no recess 33 may be provided, whereby cover 35 may extend above a surface of frame 26. Therefore, in some embodiments, a cover may overlay at least a portion of a frame with the pins thereof projecting into cooperative apertures in the frame and through cooperative holes in a multi-page booklet when the multi-page booklet is received in the slot.

Figure 4D:
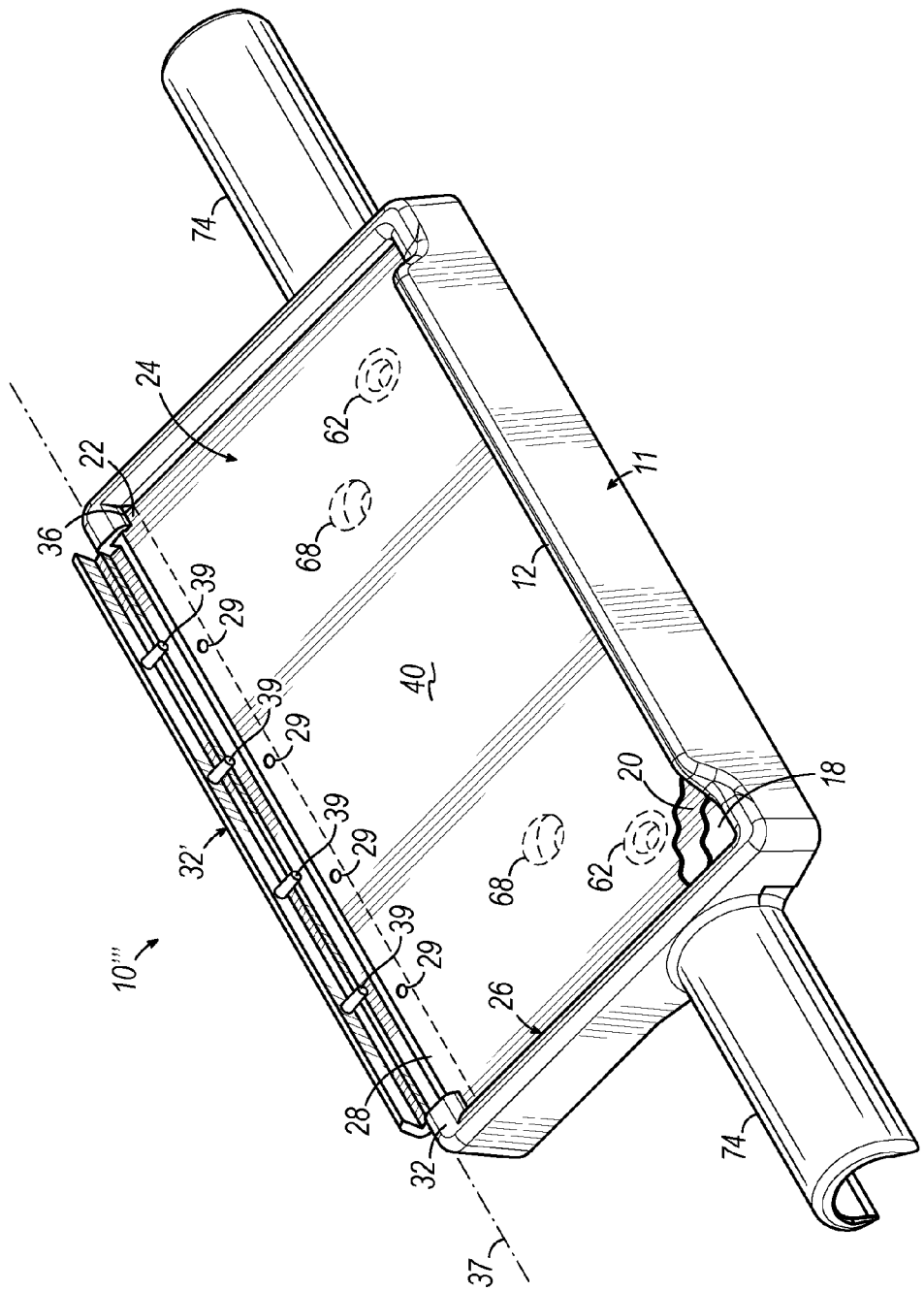
FIG. 4D is a perspective view of a shopping cart attachment including an alternate configuration for securing a multi-page booklet using a hinged frame.

Also, in some embodiments, a top portion of the frame may be removable or moveable to facilitate installation and/or removal of a booklet. For example, as illustrated by device 10'" of FIG. 4D, a top portion 32' of frame 26 may be pivotably mounted to enable the top portion to pivot away from support surface 18 (e.g., about axis 37) to permit a booklet to be installed or removed from the device. Pins 39 may be formed or otherwise coupled to an underside of top portion 32' such that the pins 39 may engage with corresponding holes 29 in booklet 24 when top portion 32' is pivoted to a closed position. It will be appreciated that detents, tabs, a pressure-fit arrangement, or a spring bias may be used to retain top portion 32' in a closed position. In still other embodiments, pins 39 may not be coupled to the underside of top portion 32', but may extend upwardly from the underside of device 10"", such that top portion 32' merely abuts the ends of the pins or posts or otherwise retains the booklet with the holes 29 retained by the pins or posts. In some embodiments, therefore, a frame may include first and second portions, with pins coupled to the first portion and with the first portion movable between first and second positions relative to the second portion, and such that the first portion may be configured to orient the plurality of pins to project through the plurality of cooperative holes in the multi-page booklet when the first portion is in the first position and the multi-page booklet is received in the slot.

As yet another alternative, a clamp such as clamp 44 of FIG. 4A may not be pivotably mounted, and may instead include slots engaging posts 48 and/or rib 42 that permit the clamp to slide in a direction between the top and bottom sides of the frame on the underside of the device to permit a clamping edge to move from a first position overlaying the underside of a body and/or support surface and a second position overlaying the binding of a booklet when in an operative position. The clamp may be sized and configured to apply a clamping force to retain the booklet in the operative position, and in some embodiments, tabs or detents in the slots may restrict movement of the clamp between the first and second positions. Other variations will be apparent to one of ordinary skill in the art having the benefit of the instant disclosure.

Figure 6:
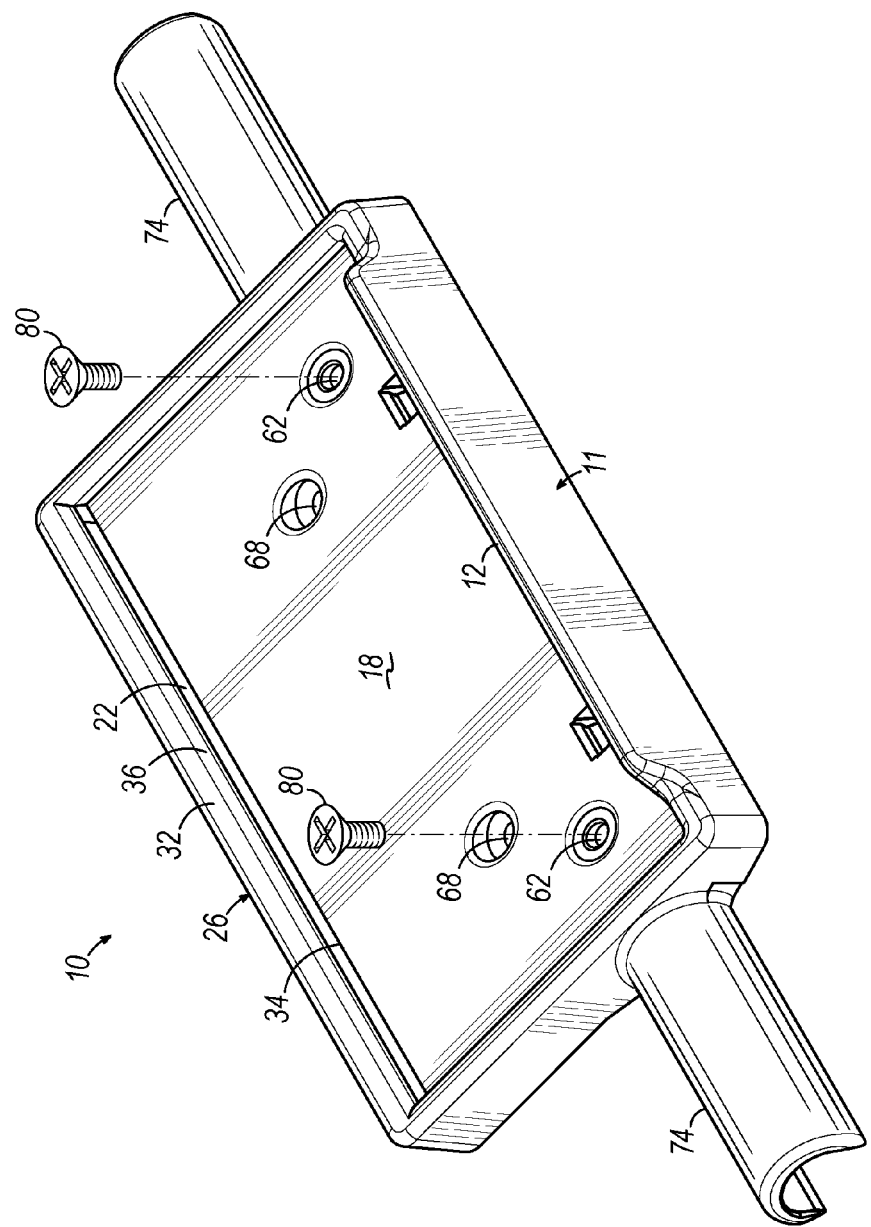
FIG. 6 is a perspective view of the shopping cart attachment of FIG. 1, illustrating fasteners that may be used to secure the shopping cart attachment to a shopping cart.
Figure 8:
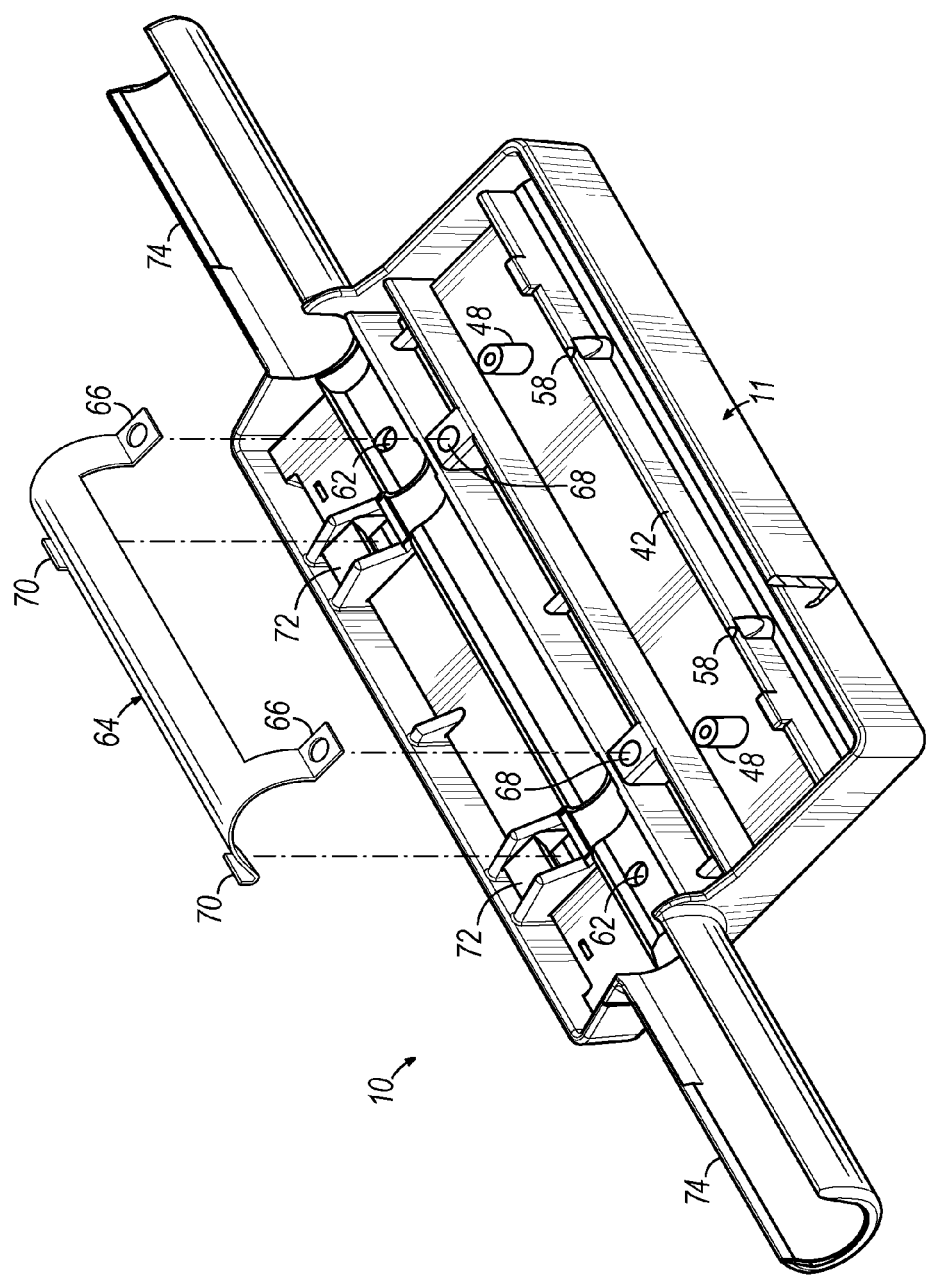
FIG. 8 is a perspective view of an underside of the shopping cart attachment of FIG. 1 and a bracket that may be used to secure the shopping cart attachment to a shopping cart.
Figure 9:
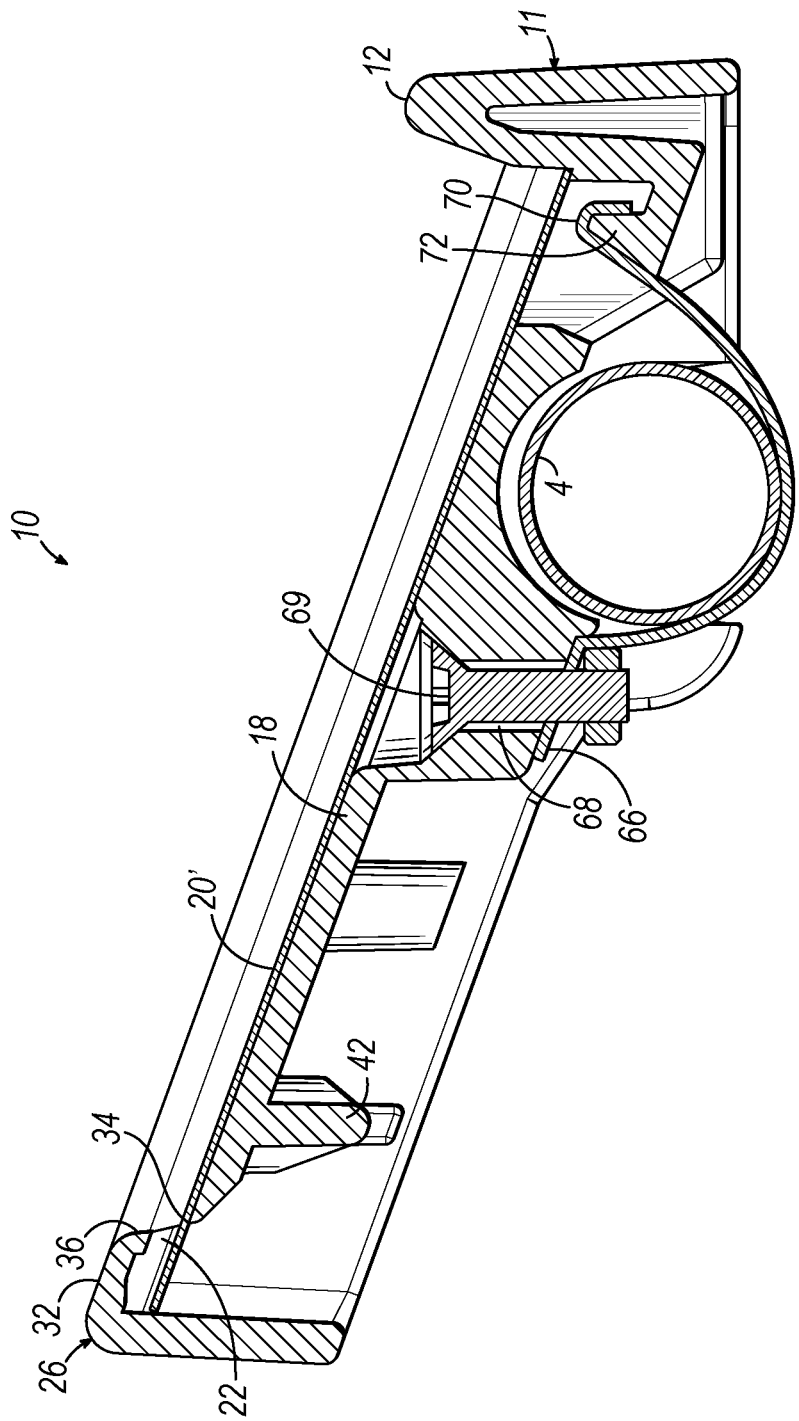
FIG. 9 is a cross-sectional view illustrating a catch formed on the shopping cart attachment of FIG. 1.

As shown in FIGS. 6 and 8, to secure device 10 to a shopping cart, fasteners (e.g., screws or bolts) 80 may be received in apertures 62 and engage with a shopping cart handlebar. Alternatively, as further illustrated in FIG. 8, a bracket 64 may be used to clamp device 10 onto a shopping cart handlebar without having to drill holes or otherwise modify the handlebar. In this embodiment, hooks 70 on bracket 64 may engage with corresponding catches 72 molded into device 10 (see also FIG. 9) when the device is placed on a shopping cart handlebar, and the device may be secured to the handlebar using fasteners (e.g., screws or bolts/nuts 69, as shown in FIG. 9) projecting through tabs 66 on bracket 64 and apertures 68 in device 10. As yet another alternative, adhesives, such as an adhesive strip, may be used to mount device 10 on a shopping cart handlebar. Other variations will be apparent to one of ordinary skill in the art having the benefit of the instant disclosure.

It will be appreciated that in some embodiments, it may be desirable to remove any existing handles or structures mounted on the handlebar of the shopping cart prior to installation of device 10, while in other embodiments, the device may be configured to install directly over an existing structure on a handlebar.

Figure 7:
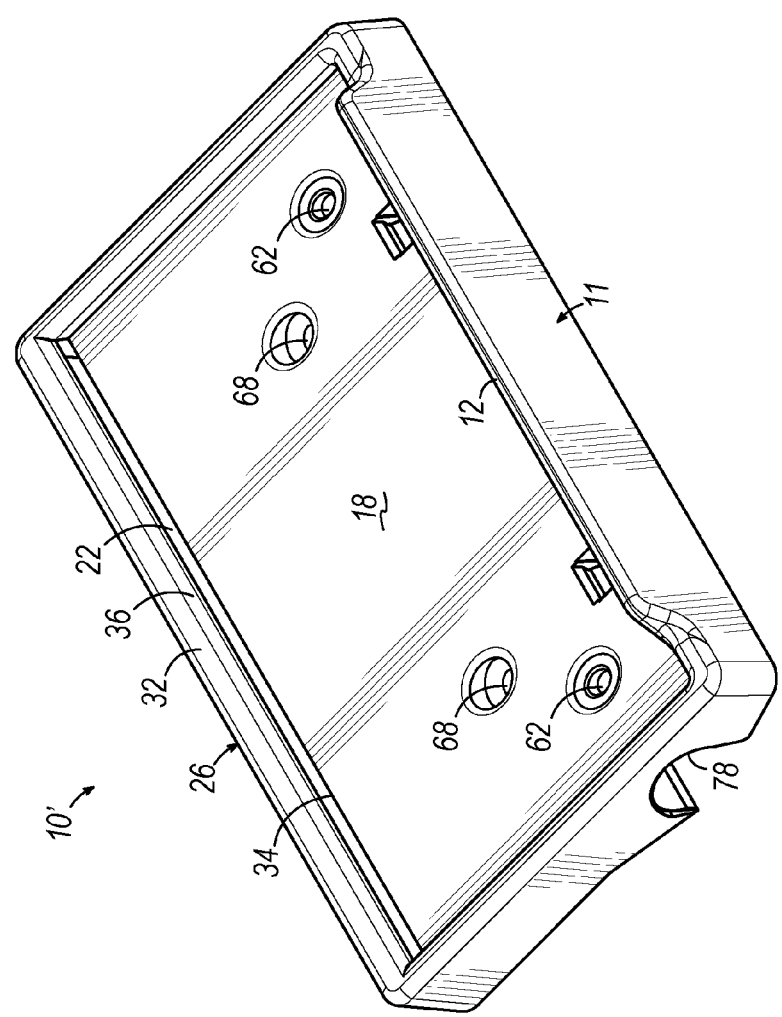
FIG. 7 is a perspective view of a non-handled shopping cart attachment consistent with the invention.

In addition, as illustrated in FIG. 6 as well as in FIG. 1, it may be desirable to include left and right handles 74 in device 10 to serve as at least a portion of the handle for the shopping cart. In other embodiments, e.g., as illustrated by device 10' in FIG. 7, the handles may be omitted. In some embodiments, for example, the same mold may be used to produce both handled and non-handled versions, and in some instances, the handles may be cut off or otherwise removed after molding. In such instances, recesses 78 may be defined in the sides of the device to receive a portion of any existing handle structure on the shopping cart.

Embodiments consistent with the invention provide multiple benefits to a retailer and a customer using a shopping cart. For example, customers may place shopping lists, coupons, writing utensils and their mobile phone down so they have their hands free to shop. Customers may have at their convenience a variety of store information available to them at all times throughout the shopping trip. In some embodiments, a single device allows the option to have both a single sided informational sheet mounted to a support surface and a multi-page booklet retained within a slot without obscuring or damaging the single sided informational sheet underneath. A benefit of retaining a multi-page booklet in a slot separate from a single sided informational sheet secured to a support surface is that the information in the booklet and the information in the single sided informational sheet may have different valid dates, so there is no requirement to install or replace both at the same time.

Furthermore, from the perspective of managing multiple shopping carts in a store, the manner in which multi-page booklets may be removed and replaced, e.g., by simply sliding the booklets in and out of slots, enables booklets to be swapped out with reduced time and effort, and generally with more aesthetically-pleasing results.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A shopping cart attachment, comprising:
   a body including a support surface;
   a frame extending around at least a portion of the support surface and separated from the support surface substantially along a first edge of the support surface by a slot, wherein the slot is configured to receive a multi-page booklet to thereby retain the multi-page booklet with the multi-page booklet overlaying at least a portion of the support surface, wherein the slot is configured to receive a security tab of the multi-page booklet to thereby retain the multi-page booklet with at least one page of the multi-page booklet overlaying at least a portion of the support surface and the security tab deflected away from the at least one page and extending along an underside of the body, and wherein the slot is contiguous at least along a length corresponding to a width of the security tab; and
   a structure projecting from the support surface on the underside of the body proximate the slot to deflect the security tab of the multi-page booklet when the multi-page booklet is retained on the attachment.

2. The shopping cart attachment of claim 1, wherein the security tab is secured to the at least one page along a binding, and wherein the binding is received within the slot such that the at least one page and the security tab are bound proximate the first edge of the support surface and extend on opposite sides of the support surface.

3. The shopping cart attachment of claim 1, wherein the slot is contiguous at least along a length at least equal to a width of the multi-page booklet.

4. The shopping cart attachment of claim 1, wherein the frame includes a second edge extending along the slot opposite the first edge of the support surface, wherein the second edge is separated from the first edge in a first direction transverse to a plane defined by the support surface, and is separated from the first edge in a second direction generally transverse to the slot and along the plane defined by the support surface, to permit the multi-page booklet to be inserted into and/or removed from the slot while oriented in a direction generally transverse to the plane defined by the support surface.

5. The shopping cart attachment of claim 4, wherein the first and second edges extend along a top side of the frame, and wherein the multi-page booklet is bound along a top edge thereof.

6. The shopping cart attachment of claim 5, further comprising a ledge coupled to a bottom side of the frame and configured to support one or more items when the shopping cart attachment is mounted on a shopping cart with the support surface oriented at an inclined angle.

7. The shopping cart attachment of claim 4, wherein the structure comprises a rib extending generally along the slot.

8. The shopping cart attachment of claim 1, further comprising a clamp coupled on an underside of the body and configured to engage a binding of the multi-page booklet on an underside of the body.

9. The shopping cart attachment of claim 8, wherein the clamp is spring loaded.

10. The shopping cart attachment of claim 8, wherein the clamp is slidable generally in a direction between top and bottom sides of the frame.

11. The shopping cart attachment of claim 1, further comprising a plurality of pins configured to project through a plurality of cooperative holes in the multi-page booklet when the multi-page booklet is received in the slot to restrict removal of the multi-page booklet from the slot.

12. The shopping cart attachment of claim 11, wherein the plurality of pins are coupled to a clamp, and wherein the clamp is coupled to an underside of the body and movable to selectively withdraw the plurality of pins from the holes in the multi-page booklet to permit removal of the multi-page booklet from the slot.

13. The shopping cart attachment of claim 11, wherein the plurality of pins are coupled to a cover, wherein the frame includes a plurality of apertures, and wherein the cover is configured to overlay at least a portion of the frame with the pins projecting into the plurality of apertures and through the plurality of cooperative holes in the multi-page booklet when the multi-page booklet is received in the slot.

14. The shopping cart attachment of claim 11, wherein the frame includes first and second portions, wherein the plurality of pins are coupled to the first portion and the first portion is movable between first and second positions relative to the second portion, and wherein the first portion is configured to orient the plurality of pins to project through the plurality of cooperative holes in the multi-page booklet when the first portion is in the first position and the multi-page booklet is received in the slot.

15. The shopping cart attachment of claim 1, further comprising left and right handles coupled to the body and configured to extend along a handlebar of a shopping cart.

16. The shopping cart attachment of claim 1, further comprising a bracket including at least one hook configured to engage with a catch defined on an underside of the body, the bracket configured to circumscribe a handlebar of a shopping cart to secure the body to the shopping cart.

17. The shopping cart attachment of claim 1, further comprising an informational sheet mounted on the support surface.

18. The shopping cart attachment of claim 17, wherein the informational sheet extends at least partially into the slot.

19. The shopping cart attachment of claim 17, wherein the informational sheet is unobstructed by the multi-page booklet when each page of the multi-page booklet that extends over a top side of the support surface is lifted off of the support surface.

20. A shopping cart, comprising a handlebar and the shopping cart attachment of claim 1 mounted to the handlebar.

21. A combination shopping cart attachment and multi-page booklet, comprising: a body including a support surface, the body configured to mount to a shopping cart handlebar;

a frame extending around the support surface and separated from the support surface substantially along a first edge of the support surface by a contiguous slot; and a multi-page booklet received in the slot and overlaying at least a portion of the support surface, the multi-page booklet including a plurality of pages and a security tab bound together along a binding, wherein the binding is received in the slot and the security tab is deflected away from the plurality of pages and extends along an underside of the body.

22. A method of securing a multi-page booklet onto a shopping cart attachment mounted to a shopping cart handlebar, wherein the multi-page booklet includes a security tab and at least one page bound together along a binding, the method comprising:

inserting the binding of the multi-page booklet into a contiguous slot defined on a body of the shopping cart attachment, wherein the slot extends along a first edge of a support surface of the body and separates the support surface from a frame that extends around at least a portion of the support surface; and after the multi-page booklet is inserted into the slot such that a distal edge of the security tab has passed the first edge of the support surface, withdrawing the multi-page booklet from the slot with the security tab extending on an underside of the body and deflected away from the at least one page of the multi-page booklet, and with the at least one page of the multi-page booklet overlaying at least a portion of the support surface.

23. The method of claim 22, further comprising removing the multi-page booklet from the shopping cart attachment by thereafter inserting the booklet further into the slot until the distal edge of the security tab has passed the first edge of the support surface and the security tab is no longer deflected away from the at least one page of the multi-page booklet.

* * * * *